(12) United States Patent
Joergensen

(10) Patent No.: US 9,067,706 B2
(45) Date of Patent: Jun. 30, 2015

(54) MEDICAL CONTAINER PROTECTED AGAINST CRACKING

(75) Inventor: Astrid Norman Joergensen, Copenhagen N (DK)

(73) Assignee: Novo Nordisk A/S, Bagsvaerd (DK)

(*) Notice: Subject to any disclaimer, the term of this patent is extended or adjusted under 35 U.S.C. 154(b) by 0 days.

(21) Appl. No.: 13/805,114

(22) PCT Filed: Jun. 20, 2011

(86) PCT No.: PCT/EP2011/060207
§ 371 (c)(1),
(2), (4) Date: Apr. 30, 2013

(87) PCT Pub. No.: WO2011/161044
PCT Pub. Date: Dec. 29, 2011

(65) Prior Publication Data
US 2013/0213961 A1    Aug. 22, 2013

Related U.S. Application Data

(60) Provisional application No. 61/358,254, filed on Jun. 24, 2010.

(30) Foreign Application Priority Data

Jun. 22, 2010   (EP) ..................... 10166768

(51) Int. Cl.
| | |
|---|---|
| C23C 16/00 | (2006.01) |
| B65D 1/42 | (2006.01) |
| A61J 1/00 | (2006.01) |
| C08J 7/04 | (2006.01) |
| A61J 1/05 | (2006.01) |
| A61J 1/14 | (2006.01) |

(52) U.S. Cl.
CPC ... B65D 1/42 (2013.01); C08J 7/04 (2013.01); A61J 1/05 (2013.01); A61J 1/00 (2013.01); A61J 2001/1468 (2013.01); C08J 7/047 (2013.01); C08J 2323/18 (2013.01); C08J 2465/04 (2013.01); A61J 1/1468 (2015.05)

(58) Field of Classification Search
CPC ............... A61J 1/00; A61J 1/05; C08J 7/04; C08J 2465/04

USPC ................................................. 427/2.1, 248.1
See application file for complete search history.

(56) References Cited

U.S. PATENT DOCUMENTS

| | | | | |
|---|---|---|---|---|
| 5,853,833 A * | 12/1998 | Sudo et al. | ................... | 428/36.6 |
| 6,626,170 B1 * | 9/2003 | Barnes et al. | ............. | 128/200.23 |
| 6,680,091 B2 | 1/2004 | Buch-Rasmussen et al. | | |
| 2001/0004682 A1 | 6/2001 | Weston | | |
| 2004/0241364 A1 * | 12/2004 | Zihlmann | ................... | 428/35.7 |
| 2005/0008848 A1 | 1/2005 | Saccomanno et al. | | |
| 2009/0017295 A1 | 1/2009 | Liu et al. | | |

FOREIGN PATENT DOCUMENTS

| | | | |
|---|---|---|---|
| EP | 1445627 | A2 | 8/2004 |
| EP | 1810758 | A1 | 7/2007 |
| JP | S6470055 | A | 3/1989 |
| JP | H07501 | A | 1/1995 |
| JP | 09058649 | A * | 3/1997 |
| JP | H09253073 | A | 9/1997 |
| JP | 2000070331 | A | 3/2000 |
| JP | 2008529629 | A | 8/2008 |
| JP | 2009084203 | A | 4/2009 |
| JP | 2009-207618 | A | 9/2009 |
| JP | 2009207618 | A * | 9/2009 |
| JP | 2010519090 | A | 6/2010 |
| JP | 2010-155134 | A | 7/2010 |
| JP | 2011063539 | A | 3/2011 |
| WO | 98/27926 | A1 | 7/1998 |

OTHER PUBLICATIONS

JP 09-058649 A translation retreived Mar. 23, 2014.*
JP 2009-207618A translation retreived Mar. 23, 2014.*
Barz et al. Parylene Coating of Polymeric Materials. Jahrbuch Oberflaechentechnik, vol. 64, pp. 89-99.*
Barz et al., Parylene Coating of Polymer Materials, Jahrbuch Oberflaechentechnik, vol. 64, pp. 89-99 (2008).
Holger Becker et al., Ploymer Microfabrication Methods for . . . , Electrophoresis, vol. 12, pp. 12-26 (2000).

* cited by examiner

*Primary Examiner* — Cachet Sellman
(74) *Attorney, Agent, or Firm* — Leon Y. Lum

(57) ABSTRACT

Medical containers made of plastic can be protected against cracking by adding a layer of a poly-paraxylylene structure to said container.

24 Claims, No Drawings

MEDICAL CONTAINER PROTECTED AGAINST CRACKING

CROSS-REFERENCE TO RELATED APPLICATIONS

This application is a 35 U.S.C. §371 National Stage application of International Application PCT/EP2011/060207 (WO 2011/161044), filed Jun. 20, 2011, which claimed priority of European Patent Application 10166768.1, filed Jun. 22, 2010; this application claims priority under 35 U.S.C. §119 of U.S. Provisional Application 61/358,254; filed Jun. 24, 2010.

FIELD OF THIS INVENTION

This invention relates to medical containers made of plastic which are protected against cracking and aspects closely related thereto.

BACKGROUND OF THIS INVENTION

Within many fields, there has been a tendency to exchange devices made of glass with devices made of plastic and, in many cases, a large amount of different plastic materials have been tested for use in such devices. Many devices which earlier were prepared from glass are now being prepared from different plastic materials and such devices now made from plastic materials have properties, or at least some properties, which are better than the properties of the analogous devices when made from glass. However, it is not always so that all devices now made from plastic materials have properties which are better than the properties of the analogous devices when made from glass. An example of this is medical containers made from plastic materials such as COP (cyclic olefin polymer) and COC (cyclic olefin copolymer). Unfortunately, medical containers made from plastic materials such as COP or COC are sensitive to non-polar solvents. For example, a COC such as Topas is prone to Environmental Stress Cracking (ESC) at low strain levels, e.g., 0.5%, when in contact with non-polar solvents such as Vaseline or MCT (medium-chain triglycerides) oil, representing ingredients present in many hand lotions. Thus, Topas cannot completely satisfactory be used for a liquid drug container (medical container) when user handling is required, especially not if the medical container is to be used a certain time after the container has been touched by a person having had hand lotion on the fingers and if there are residual stresses in the material or the material is subjected to an external load or strain.

JP 2009 207618 describes a manufacturing method of medical containers used for storing pharmaceutical substances by forming a cover made of parylene (poly-xylylene polymer), fluorine or carbon is formed in inner surface of storage chamber. The adsorption and permeation of medical agent is prevented. Cracking is not dealt with therein, neither is COC.

In *Jahrbuch Oberflaechentechnik* 64 (2008), 89-99, it is mentioned that, for example, polycarbonate, polyethene, cycloolefin copolymer and polytetrafluoroethylene can be coated with parylene. Some of the advantages mentioned for some of these coated materials are barrier properties, e.g., to oxygen and aqueous vapour, electrical insulation, and high thermal stability; however, cracking is not mentioned. The paper does not deal with medical containers.

Environmental Stress Cracking (ESC) is one of the most common causes of unexpected brittle failure of thermoplastic (especially amorphous) polymers known at present. Environmental stress cracking may account for around 15-30% of all plastic component failures in service.

ESC and polymer resistance to ESC (ESCR) have been studied for several decades. Research shows that the exposure of polymers to liquid chemicals tends to accelerate the crazing process, initiating crazes at stresses that are much lower than the stress causing crazing in air. The action of either a tensile stress or a corrosive liquid alone would not be enough to cause failure, but in ESC the initiation and growth of a crack is caused by the combined action of the stress and a corrosive environmental liquid.

ESC is somewhat different from polymer degradation in that stress cracking does not break polymer bonds. Instead, it breaks the secondary linkages between polymers. These are broken when the mechanical stresses cause minute cracks in the polymer and they propagate rapidly under the harsh environmental conditions. It has also been seen that catastrophic failure under stress can occur due to the attack of a reagent that would not attack the polymer in an unstressed state.

OBJECTS OF THIS INVENTION

The object of this invention is to overcome or ameliorate at least one of the disadvantages of the prior art, or to provide a useful alternative.

Another aspect of this invention relates to the furnishing of medical containers with improved resistance to cracking, e.g., to ESC.

Another aspect of this invention relates to the furnishing of medical containers with improved barrier to carbon dioxide.

Another aspect of this invention relates to the furnishing of medical containers with improved barrier to non-polar solvents, e.g. oil.

Another aspect of this invention relates to the furnishing of medical containers with reduction of friction.

DEFINITIONS

Herein, the term "medical container" covers a container containing a medicament, for example, a medical solution or suspension, or a container which can be used for storing a medicament, for example, a medical solution or suspension for a certain period of time, be it long or short.

Herein the term "medicament" covers compounds used for the treatment of patients.

Herein, the term "medical solution or suspension" covers a solution or suspension containing a medicament or another component used for the treatment of patients.

The term "COC" is a generally accepted abbreviation for cyclic olefin copolymer. Examples of COC's are, e.g., described in U.S. Pat. No. 6,680,091 B2 which is hereby incorporated by reference. More specifically, COC's are described in claim 1 of said patent. Hence, according to said claim, COC is a material comprising at least 70% by weight of a co-polymer material composed of aliphatic cyclic or bicylic hydrocarbons with 5 to 7 membered ring or rings, and ethylene or propylene, and wherein the ethylene or propylene is present in the polymer material in an amount of at least 20% of the at least 70%. A specific example of a COC is Topas. Topas is the trade name for cyclic olefin copolymers (COC). Topas consists of amorphous, transparent copolymers based on cyclic olefins and linear olefins of the formula:

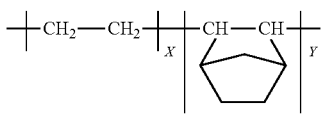

wherein x and y are the number of repeating units.

The term "COP" is a generally accepted abbreviation for cyclic olefin polymer. COP is a material comprising at least 70% by weight of a linear optionally branched polyolefin material, the olefin monomer being selected from ethylene, propylene, butylene or a mixture thereof. More details of COP's can be found in WO 98/27926 which is hereby incorporated by reference. A specific example of a COP is zeonex.

A number of different methods can be used to evaluate a polymer's resistance to Environmental Stress Cracking. Herein, the crucial test method is that described in ISO 22088-3:2006; Plastics—Determination of resistance to environmental stress cracking (ESC)—Part 3: Bent strip method. In this test, a fixture with 0.6% strain is to be used. If no cracking is observed after 5 minutes, preferably after 15 minutes, by this test, the material tested has a sufficient resistance to Environmental Stress Cracking and this material is covered by this invention.

SUMMARY OF THE INVENTION

This invention relates to medical containers having improved properties.

DETAILED DESCRIPTION OF THIS INVENTION

Surprisingly, it has been found that when a medial container made of a plastic material such as COP or COC is coated with a non-halogenated, chlorinated or fluorinated polymer, the resulting medical container is less prone to crack. In one embodiment, the coating is made of parylene.

In one embodiment, the medical container is placed in a polymerisation chamber which is operated a room temperature. The coating thickness can be controlled by the time spend in the polymerisation chamber. When the parylene dimers are heated, they decompose to monomers which polymerize during condensation to room temperature.

Using the teachings of this specification, the skilled art worker can easily determine which thickness of the cracking preventing layer to use. The thickness of the cracking preventing layer used shall be sufficient to obtain the desired effect and shall not have an adverse effect on the medical container or the use thereof.

In one embodiment, the coating is applied in a thickness of about 21 μm.

The medical container can have a cracking preventing layer on the inner side of the walls and/or on the outer side of the walls. If the cracking preventing layer is on the inner side of the walls of the medical container, the cracking preventing layer is either on the whole inner side of the walls or on a part of said walls, preferably on a major part of the walls. Similarly, if the cracking preventing layer is on the outer side of the walls of the medical container, the cracking preventing layer is either on the whole outer side of the walls or on a part of said walls, preferably on a major part of the walls.

Poly-para-xylylenes (sometimes designated poly-para-xylelenes, poly-p-xylylenes or poly-para-xylenes) are described in *Polymer Engineering and Science* 16 (1976), 473-9. Therein is a description of the chemistry of said polymers and the application thereof in coating technology which publication is hereby incorporated by reference. Specific examples of poly-para-xylylenes to be used in this invention are parylenes, for example, parylene N, parylene C, parylene D, parylene F and/or parylene HT.

Poly-para-xylylenes are characterized by the following polymer repeat unit structure: $[-CH_2-C_6H_4-CH_2-]_n$ wherein one or more hydrogen atoms on the phenyl-1,4-ene moiety illustrated by $-C_6H_4-$, optionally, is/are substituted by one or more chlorine atoms, preferably one or two, and/or one or more fluorine atoms, preferably one or two, and/or wherein the methylene part in xylylene optionally is substituted by one or more fluorine atoms, preferably one or two, and n indicates the number of repeating units in the structure. In parylene N, the above phenyl-1,4-ene moiety is not substituted and the methylene part in xylylene is not substituted. Hence, in parylene N, the repeat structure is $[-CH_2-C_6H_4-CH_2-]_n$. Parylene N is a completely linear, highly crystalline material. In parylene C, each of the above phenyl-1,4-ene moieties are substituted by a single chlorine atom in the 2 position and the methylene part in xylylene is not substituted. Hence, in parylene C, the repeat structure is $[-CH_2-C_6H_3Cl-CH_2-]_n$. In parylene D, each of the above phenyl-1,4-ene moieties are substituted by two chlorine atoms being present in the 2 and 5 position. Hence, in parylene D, the repeat structure is $[-CH_2-C_6H_2Cl_2-CH_2-]_n$. In parylene HT, the above phenyl-1,4-ene moiety is not substituted and each methylene part in xylylene is substituted by two flourine atoms. Hence, in parylene HT, the repeat structure is $[-CF_2-C_6H_4-CF_2-]_n$. In parylene F, the above phenyl-1,4-ene moiety is substituted by 4 fluorine atoms being present in the 2, 3, 5 and 6 position, and no methylene part in xylylene is substituted. Hence, in parylene F, the repeat structure is $[-CH_2-C_6F_4-CH_2-]_n$.

Some poly-para-xylylenes have an average molecular weight of about 500,000 g/mol. However, the average molecular weight of poly-para-xylylenes can vary within a large range, for example between about 50,000 and about 50,000,000 g/mol and may even be outside this range.

Parylenes have medical approval in USP Class VI (for implants) which eliminates hazards if particles should, unintentionally, be released into the drug solution or suspension.

The COP or COC medical containers used in this invention are, preferably, transparent. In one embodiment, the transparency of the medical container is at least 80%, preferably at least 90%, more preferred at least 92, measured at the wave length 462 nm, and determined, for example, as described in the Japanese Pharmacopoeia. The COP or COC medical containers used in this invention maintain most of their transparency during and after the coating has taken place and, consequently, they have a satisfactory transparency. In one embodiment, the transparency of the medical container according to this invention is at least 70%, preferably at least 80%, more preferred at least 85% and even more preferred at least 90%, measured as described above.

Examples of medicaments which can be present in the medical container of this invention are insulin, GLP-1, growth hormone and analogues thereof. Such analogues are known to the skilled art worker and are published widely.

Selected parylene grades can be steam sterilised.

In one embodiment, the cracking preventing layer forms a film.

In another embodiment, there are no or only an inferior amount of pinholes in the cracking preventing layer.

Parylene adhesion to the medical container can be increased by various types of plasma treatments, e.g. Corona treatment or other chemical plasma treatments. Plasma treatments enhance the surface energy, thereby increasing the ability to physically bond to the polymer coating layer.

Corona treatment is an oxygen plasma treatment performed at ambient conditions (in air).

Other types of plasma treatments involve flame plasma treatment and chemical plasma treatments (variable gases depositing chemical groups on the surface). Parylene adhesion can be increased by the use of an adhesion promotor, e.g. AdPro Plus, developed to increase adhesion of parylene to plastics and other smooth or low-energy surfaces.

PREFERRED FEATURES OF THIS INVENTION

To sum up and supplement the above statements, the features and clauses of this invention are as follows:

1. A medical container wherein the wall consists of a polymer material consisting of a cyclic olefin polymer or a cyclic olefin copolymer which container has a cracking preventing layer on the inner and/or outer side of said wall material.
2. A medical container according to clause 1 wherein the polymer material is a cyclic olefin copolymer.
3. A medical container according to any one of the preceding clauses wherein the polymer material is as described in U.S. Pat. No. 6,680,091, for example in claim 1 therein.
4. A medical container according to the preceding clause wherein the polymer material is a material comprising at least 70% by weight of a co-polymer material composed of aliphatic cyclic or bicyclic hydrocarbons with 5 to 7 membered ring or rings, and ethylene or propylene, and wherein the ethylene or propylene is present in the polymer material in an amount of at least 20% of the at least 70%.
5. A medical container according to any one of the preceding clauses wherein the cracking preventing layer is coated to/on the container.
6. A medical container according to any one of the preceding clauses wherein the cracking preventing layer is a non-halogenated, chlorinated or fluorinated polymer.
7. A medical container according to any one of the preceding clauses wherein the cracking preventing layer is a poly-para-xylylene structure.
8. A medical container according to any one of the preceding clauses wherein the cracking preventing layer has the following polymer repeat unit structure: $[—CH_2—C_6H_4—CH_2—]_n$, wherein one or more hydrogen atoms on the phenyl-1,4-ene moiety illustrated by $—C_6H_4—$ optionally is/are substituted by one or more chlorine atoms, preferably one or two, and/or one or more fluorine atoms, preferably one or two, and/or wherein the methylene part in xylylene optionally is substituted by one or more fluorine atoms, preferably one or two, and n indicates the number of repeating units in the structure.
9. A medical container according to any one of the preceding clauses wherein there are no or substantially no pin-holes in the cracking preventing layer.
10. A medical container according to any one of the preceding clauses which only has a cracking preventing layer on the inner side of said wall material (and has no or substantially no cracking preventing layer on the outer side of said wall material).
11. A medical container according to any one of the preceding clauses to the extent possible which only has a cracking preventing layer on the outer side of said wall material (and has no or substantially no cracking preventing layer on the inner side of said wall material).
12. A medical container according to any one of the preceding clauses wherein the wall material is equipped with a multilayer structured cracking preventing layer which multilayer may consist of identical polymers or different polymers.
13. A medical container according to any one of the preceding clauses to the extent possible, wherein the coating polymer is a poly-para-xylylene.
14. A medical container according to any one of the preceding clauses wherein the thickness of the cracking preventing layer is not more than about 70 μm.
15. A medical container according to any one of the preceding clauses wherein the thickness of the cracking preventing layer is not more than about 50 μm.
16. A medical container according to any one of the preceding clauses wherein the thickness of the cracking preventing layer is not more than about 25 μm.
17. A medical container according to any one of the preceding clauses wherein the thickness of the cracking preventing layer is at least about 5 μm.
18. A medical container according to any one of the preceding clauses wherein the thickness of the cracking preventing layer is at least about 1 μm.
19. A medical container according to any one of the preceding clauses wherein the cyclic olefin layer has had a surface pre-treatment and/or an adhesion promoting layer so as to enhance the adhesion between the cyclic olefin layer and the cracking preventing layer.
20. A medical container according to any one of the preceding clauses wherein the cracking preventing layer is parylene N, parylene C, parylene D, parylene F and/or parylene HT.
21. A medical container according to any one of the preceding clauses containing a medicament.
22. A medical container according to any one of the preceding clauses containing a liquid solution or suspension of a medicament.
23. A medical container according to any one of the preceding clauses to the extent possible containing said medicament in solid form, for example freeze dried.
24. A medical container according to any one of the preceding clauses containing an aqueous solution or suspension of a medicament.
25. A medical container according to any one of the preceding clauses which is wholly or partially filled with an aqueous or another liquid solution or suspension.
26. A medical container according to any one of the preceding clauses wherein said solution or suspension contains a peptide.
27. A medical container according to any one of the preceding clauses wherein said peptide is insulin, GLP-1, growth hormone or an analogue thereof.
28. A medical container according to any one of the preceding clauses the volume of which is between about 1 and about 10 ml.
29. The use of a cracking preventing layer on a medical container to reduce the risk of cracking.
30. The use of a cracking preventing layer to reduce the risk of cracking on a medical container whereby said medical container is equipped with a layer of said cracking preventing layer.
31. The use according to the preceding use clauses wherein the cracking preventing layer is a parylene grade.
32. Any novel feature or combination of features described herein, especially features described in a clause or in a claim.

Combining one or more of the clauses and embodiments described herein, optionally also with one or more of the claims below, results in further embodiments and the present invention relates to all possible combinations of said clauses, embodiments and claims.

The following example is offered by way of illustration, not by limitation.

Example 1

A medical container made of Topas was placed in a polymerisation chamber which was operated at room temperature. The time spent in the polymerisation chamber was adjusted to give a thickness of about 21 μm. The results obtained were as follows: The parylene F coating was obtained in 21 μm thickness on a COC Topas dumbbell test bar. The dumbbell test bar was fixed in a 0.6% strain test fixture and tested for Environmental Stress Cracking with Vaseline paste and MCT oil. The coated test bars did not show any sign of stress cracking, even after 21 hours, whereas the reference test bars without the parylene F layer had severe sign of crazing and cracks after 2 min. This illustrates that, using the cracking preventing layer, a satisfactory prevention of the Environmental Stress Cracking was obtained.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law).

The citation and incorporation of patent documents herein is done for convenience only and does not reflect any view of the validity, patentability, and/or enforceability of such patent documents. The mentioning herein of references is no admission that they constitute prior art.

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Herein, the word "comprise" is to be interpreted broadly meaning "include", "contain" or "comprehend" (vide, EPO guidelines C, III, 4.13).

This invention includes all modifications and equivalents of the subject matter recited in the claims and clauses appended hereto as permitted by applicable law.

What is claimed is:

1. A method of preparing a medical container, comprising providing a medical container of cyclic olefin polymer (COP) or of cyclic olefin copolymer (COC),
coating said medical container with a layer of a poly-para-xylylene comprising the following repeat unit structure: [—CH$_2$—C$_6$H$_4$—CH$_2$—]$_n$, wherein n indicates the number of repeating units in the structure,
wherein one or more hydrogen atoms on the phenyl-1,4-ene moiety illustrated by —C$_6$H$_4$— is/are substituted by a fluorine atom, and
wherein the resistance to Environmental Stress Cracking of the medical container is increased compared to a medical container of COP or of COC without the poly-para-xylylene layer.

2. The method according to claim 1, wherein one or more hydrogen atoms on the phenyl-1,4-ene moiety illustrated by —C$_6$H$_4$— is/are substituted by a chlorine atom.

3. The method according to claim 2, wherein one hydrogen atom is substituted by a chlorine atom.

4. The method according to claim 2, wherein two hydrogen atoms are each substituted by a chlorine atom.

5. The method according to claim 1, wherein the thickness of the polymer coating is not more than about 70 μm and is at least about 1 μm.

6. The method according to claim 5, wherein the thickness is not more than about 50 μm.

7. The method according to claim 5, wherein the thickness is not more than about 25 μm.

8. A medical container prepared by the method according to claim 1.

9. The method according to claim 1, wherein one hydrogen atom is substituted by a fluorine atom is substituted.

10. The method according to claim 1, wherein two hydrogen atoms are each substituted by a fluorine atom.

11. The method according to claim 1, wherein the Environmental Stress Cracking is determined using a bent strip method with 0.6% strain according to ISO 22088-3:2006.

12. The method according to claim 1, wherein the poly-para-xylylene has a molecular weight between about 50,000 and about 500,000 g/mol.

13. A method of preparing a medical container, comprising providing a medical container of cyclic olefin polymer (COP) or of cyclic olefin copolymer (COC),
coating said medical container with a layer of a poly-para-xylylene comprising the following repeat unit structure: [—CH$_2$—C$_6$H$_4$—CH$_2$—]$_n$, wherein n indicates the number of repeating units in the structure,
wherein the methylene part in xylylene is substituted by one or more fluorine atoms, and
wherein the resistance to Environmental Stress Cracking of the medical container is increased compared to a medical container of COP or of COC without the poly-para-xylylene layer.

14. The method according to claim 13, wherein the methylene part is substituted by one fluorine atom.

15. The method according to claim 13, wherein the methylene part is substituted by two fluorine atoms.

16. The method according to claim 13, wherein one or more hydrogen atoms on the phenyl-1,4-ene moiety illustrated by —C$_6$H$_4$— is/are substituted by a chlorine atom.

17. The method according to claim 16, wherein one hydrogen atom is substituted by a chlorine atom.

18. The method according to claim 16, wherein two hydrogen atoms are each substituted by a chlorine atom.

19. A medical container prepared by a treatment according to claim 13.

20. The method of according to claim 13, wherein the thickness of the polymer coating is not more than about 70 μm and is at least about 1 μm.

21. The method according to claim 20, wherein the thickness is not more than about 50 μm.

22. The method according to claim 21, wherein the thickness is not more than about 25 μm.

23. The method according to claim 13, wherein the Environmental Stress Cracking is determined using a bent strip method with 0.6% strain according to ISO 22088-3:2006.

24. The method according to claim 13, wherein the poly-para-xylylene has a molecular weight between about 50,000 and about 500,000 g/mol.

* * * * *

UNITED STATES PATENT AND TRADEMARK OFFICE
CERTIFICATE OF CORRECTION

PATENT NO. : 9,067,706 B2  
APPLICATION NO. : 13/805114  
DATED : June 30, 2015  
INVENTOR(S) : Joergensen Page 1 of 1

It is certified that error appears in the above-identified patent and that said Letters Patent is hereby corrected as shown below:

In the claims

Claim 9, column 8, line 16-17 should read "The method according to claim 1, wherein one hydrogen atom is substituted by a fluorine atom ~~is substitited~~."

Signed and Sealed this
Twenty-second Day of December, 2015

Michelle K. Lee
*Director of the United States Patent and Trademark Office*